(12) United States Patent
Sun

(10) Patent No.: US 12,091,087 B2
(45) Date of Patent: Sep. 17, 2024

(54) VEHICLE FRAME AND VEHICLE

(71) Applicant: CONTEMPORARY AMPEREX TECHNOLOGY CO., LIMITED, Ningde (CN)

(72) Inventor: Xiaowei Sun, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/351,070

(22) Filed: Jul. 12, 2023

(65) Prior Publication Data
US 2023/0356781 A1    Nov. 9, 2023

Related U.S. Application Data

(63) Continuation of application No. PCT/CN2022/111490, filed on Aug. 10, 2022.

(30) Foreign Application Priority Data

Sep. 23, 2021 (CN) .......................... 202122307742.7

(51) Int. Cl.
*B62D 21/11* (2006.01)
(52) U.S. Cl.
CPC .................................... *B62D 21/11* (2013.01)
(58) Field of Classification Search
CPC .......... B62D 3/12; B62D 21/02; B62D 21/11; B62D 3/00; B62D 3/02
See application file for complete search history.

(56) References Cited

U.S. PATENT DOCUMENTS 3,944,015 A * 3/1976 Bishop ..................... B62D 3/12
                                                  180/436
5,012,885 A    5/1991 Hilden
(Continued)

FOREIGN PATENT DOCUMENTS

CN         102145707 A        8/2011
CN         102369130 A *      3/2012    ............ B23P 11/005
(Continued)

OTHER PUBLICATIONS

Thomas Degenstein, Front axle support for vehicle, has steering gear, rack housing and toothed rack, where rack housing is rigidly connected with front axle support and forms carrier component of front axle support, Apr. 19, 2012, EPO, DE 10 2010 048 341 A1, Machine Translation of Description (Year: 2012).*

(Continued)

*Primary Examiner* — James A English
(74) *Attorney, Agent, or Firm* — Ladas & Parry LLP

(57) ABSTRACT

Embodiments of this application relate to the field of vehicle technologies, and specifically, to a vehicle frame and a vehicle. The vehicle frame includes longitudinal rails and a steering gear; the steering gear includes a shell and a steering rod slidably disposed in the shell; two ends of the shell are fixedly connected to the longitudinal rails respectively; and two ends of the steering rod respectively protrude out of the longitudinal rails, so as to be movably connected to wheels, and the steering rod drives the wheels to steer when the steering rod slides. In this way, the vehicle frame provided in the embodiments of this application is able to guarantee the torsional mode and stiffness of the whole vehicle while achieving light-weighting of the body.

10 Claims, 2 Drawing Sheets

(56) References Cited

U.S. PATENT DOCUMENTS

| | | | | |
|---|---|---|---|---|
| 6,457,375 | B1 * | 10/2002 | Buch | B62D 3/12 |
| | | | | 180/428 |
| 10,046,795 | B2 * | 8/2018 | Lee | B62D 3/12 |
| 2003/0034643 | A1 | 2/2003 | Stanley | |
| 2003/0107200 | A1 * | 6/2003 | Huang | B62D 3/12 |
| | | | | 74/498 |
| 2012/0087715 | A1 * | 4/2012 | Betke | F16J 15/3268 |
| | | | | 403/5 |
| 2014/0246260 | A1 * | 9/2014 | Awano | B62D 25/082 |
| | | | | 180/271 |
| 2016/0339953 | A1 * | 11/2016 | Park | B62D 3/12 |

FOREIGN PATENT DOCUMENTS

| | | | | |
|---|---|---|---|---|
| CN | 105313672 | A | 2/2016 | |
| CN | 206520647 | U | 9/2017 | |
| CN | 216002767 | U | 3/2022 | |
| DE | 102010048341 | A1 * | 4/2012 | ............ B62D 21/11 |
| EP | 3539810 | A1 | 9/2019 | |

OTHER PUBLICATIONS

ISR for International Application PCT/CN2022/111490 mailed Nov. 7, 2022.
Written Opinion for International Application PCT/CN2022/111490 mailed Nov. 7, 2022.

* cited by examiner

VEHICLE FRAME AND VEHICLE

CROSS-REFERENCE TO RELATED APPLICATIONS

This application is a continuation of International application PCT/CN2022/111490 filed on Aug. 10, 2022 which claims priority to Chinese patent application No. 202122307742.7, filed on Sep. 23, 2021 and entitled "VEHICLE FRAME AND VEHICLE". The subject matter of these applications is incorporated herein by reference in its entirety.

TECHNICAL FIELD

Embodiments of this application relate to the field of vehicle technologies, and specifically, to a vehicle frame and a vehicle.

BACKGROUND

In the prior art, to realize fixation of a steering gear, a vehicle frame needs to have a crossmember or a vehicle subframe for mounting and fixation of a box filler, so that a rod of the steering gear is connected to a steering knuckle on a wheel hub to pull front wheels of a vehicle to steer.

The inventors of this application have found in research that an existing mounting manner of steering gear may lead to heavy vehicle mass, thus increasing fuel consumption, and reducing product competitiveness under the current environment of energy saving and emission reduction.

SUMMARY

In view of the foregoing problems, the embodiments of this application provide a vehicle frame and a vehicle, so as to guarantee the torsional mode and stiffness of the vehicle while achieving light-weighting of the body.

According to an aspect of the embodiments of this application, a vehicle frame is provided, including longitudinal rails and a steering gear, where the steering gear includes a shell and a steering rod slidably disposed in the shell; two ends of the shell are fixedly connected to the longitudinal rails respectively; and two ends of the steering rod respectively protrude out of the longitudinal rails, so as to be movably connected to wheels, and the steering rod drives the wheels to steer when the steering rod slides.

Compared with an existing vehicle frame, the vehicle frame provided in the embodiments of this application removes a crossmember disposed between the longitudinal rails and achieves the bearing effect of the shell on the longitudinal rails by fixedly connecting two ends of the shell to the longitudinal rails, thus guaranteeing the torsional mode and stiffness of the vehicle. The longitudinal rail is disposed on the inner side of the wheel, and two ends of the steering rod respectively protrude out of the longitudinal rails to be movably connected to outer wheels, so that the steering rod drives the wheels at both ends to steer when the steering rod slides in the shell. In this way, not only assembly and fixation of the steering gear and control of the wheel steering are implemented, but also the torsional mode and stiffness of the vehicle are guaranteed.

In an optional embodiment, the longitudinal rails are each provided with a through hole, where two ends of the shell are fastened in the through holes; and the steering rod runs through the through holes, with two ends of the steering rod protruding from the through holes. The longitudinal rails being each provided with the through hole and the two ends of the shell being fastened in the through holes can not only implement assembly and fixation of the shell and the longitudinal rails, but also ensure good bearing effect of the shell between the longitudinal rails, thus guaranteeing the strength and stiffness of the overall structure of the vehicle frame and making the vehicle have a good torsional mode in subsequent assembly.

In an optional embodiment, the through hole is provided with a support sleeve, and the two ends of the shell are fastened in the support sleeves. The support sleeve is provided in the through hole for the support sleeve to support an inner wall of the through hole, thus improving structural strength of the longitudinal rail at the through hole and ensuring good and stable bearing capacity of the vehicle frame.

In an optional embodiment, the support sleeve is welded to the longitudinal rail. The support sleeve is welded to the longitudinal rail to ensure that the support sleeve is sufficiently restrained in an axial direction, thus improving stability of assembly and connection between the steering gear and the longitudinal rails and guaranteeing the overall strength and bearing capacity of the vehicle frame.

In an optional embodiment, the two ends of the shell are each provided with a restraint portion, and the restraint portion abuts against an inner side wall of the longitudinal rail. The two ends of the shell are each provided with the restraint portion, and the restraint portion abuts against the inner side wall of the longitudinal rail, so as to implement restraint and fixation of the shell of the steering gear and the longitudinal rail in the axial direction during assembly and connection.

In an optional embodiment, the restraint portion includes a flange or a protrusion disposed in the shell. The flange abuts against the inner side wall of the longitudinal rail to implement fixation of the steering gear in the axial direction. The protrusion abuts against the inner side wall of the longitudinal rail to implement restraint of the shell in the axial direction, and due to an integral structure of the protrusion and the shell, the structure is more stable and the restraint of connection between the shell and the longitudinal rail is more effective.

In an optional embodiment, the two ends of the shell protrude out of the longitudinal rails, and the shell is provided with an external thread at a position protruding out of the longitudinal rail; and the external thread is connected to a thread connecting member, where the thread connecting member abuts against an outer side wall of the longitudinal rail. As the two ends of the shell protrude out of the longitudinal rails, and the shell is provided with an external thread at a position protruding out of the longitudinal rail, the thread connecting member is connected to the external thread on one hand and abuts against the outer side wall of the longitudinal rail on the other hand, implementing assembly and connection between the part of the shell protruding out of the longitudinal rail and the longitudinal rail, guaranteeing the structural stability of the steering gear in the vehicle frame, and thus improving the overall strength and stability of the vehicle frame.

In an optional embodiment, the shell is sleeved with a washer between the thread connecting member and the outer side wall of the longitudinal rail, where two sides of the washer respectively abut against the outer side wall of the longitudinal rail and the thread connecting member. By providing the washer between the thread connecting member and the outer side wall of the longitudinal rail, on one hand, frictional damage of the thread connecting member to the surface of the longitudinal rail during tightening can be avoided, and on the other hand, the washer can share the pressure of the thread connecting member on the outer side wall of the longitudinal rail, so that the thread connecting member can be tightened to a greater extent without causing damage to the longitudinal rail, thus making the connection structure between the shell and the longitudinal rails more stable and reliable.

In an optional embodiment, the washer is welded to both the shell and the longitudinal rail. The washer being welded to the longitudinal rail and the shell can further ensure stable relative position between the washer, the longitudinal rail and the shells, making the connection structure between the shell and the longitudinal rails stable and reliable, and thereby guaranteeing the overall structural strength of the vehicle frame and the torsional mode of the vehicle.

According to another aspect of the embodiments of this application, a vehicle is provided, including the vehicle frame according to any one of the foregoing embodiments.

In the vehicle provided in the embodiments of this application, the vehicle frame removes the crossmember disposed between the longitudinal rails compared with the existing vehicle frame, and achieves the bearing capacity of the shell on the longitudinal rails by connecting two ends of the shell to the longitudinal rails in a fixed manner, thereby guaranteeing the torsional mode and stiffness of the vehicle. The longitudinal rail is disposed on the inner side of the wheel, and the two ends of the steering rod respectively protrude out of the longitudinal rails to be movably connected to the outer wheels, so that the steering rod drives the wheels at both ends to steer when the steering rod slides in the shell. In this way, not only assembly and fixation of the steering gear and control of the wheel steering are implemented, but also the torsional mode and stiffness of the vehicle are guaranteed.

In an optional embodiment, the vehicle further includes front wheels disposed on the outside of the longitudinal rails, where the front wheel has a steering knuckle; and two ends of the steering rod are rotatably connected to the steering knuckles, and the steering knuckle drives the front wheel to steer when the steering rod slides. The two ends of the steering rod protruding out of the longitudinal rails being rotatably connected to the steering knuckles can implement control of the steering of the front wheels by the steering rod, thus satisfying working position conditions during assembly of the steering gear while reducing the overall mass of the vehicle.

In an optional embodiment, the vehicle further includes a leaf spring, where the leaf spring is fixedly connected to the shell and the longitudinal rail, and two ends of the leaf spring are fixedly connected to the front wheels. The leaf spring being provided as a suspension for the front wheels in the vehicle can ensure that the leaf spring plays a good role in carrying and cushioning the front wheels when the vehicle is driving on a bumpy road.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

Persons of ordinary skill in the art can clearly understand various other advantages and benefits by reading the detailed description of the preferred embodiments below. The accompanying drawings are merely intended to illustrate the preferred embodiments and are not intended to limit this application. In addition, in all the accompanying drawings, same parts are indicated by same reference signs. In the accompanying drawings.

Figure 1:
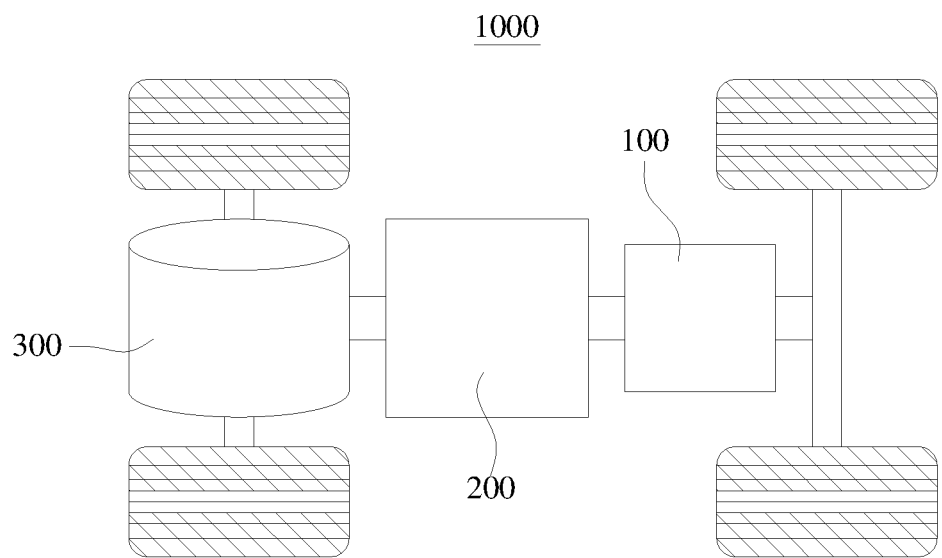
FIG. 1 is a schematic structural diagram of a vehicle according to an embodiment of this application.

Reference signs in specific embodiments are as follows:
vehicle 1000; battery 100; controller 200; motor 300;
vehicle frame 10; longitudinal rail 11; through hole 111; steering gear 12, shell 121; steering rod 122; support sleeve 13; restraint portion 14; flange 141; external thread 15; thread connecting member 16; washer 17;
vehicle 1; front wheel 20; steering knuckle 21; first portion 31; second portion 32; third portion 33; and fourth portion 34.

DESCRIPTION OF EMBODIMENTS

The following describes in detail the embodiments of technical solutions in this application with reference to the accompanying drawings. The following embodiments are merely used to describe technical solutions in this application more explicitly, and therefore they are merely used as examples and do not constitute a limitation to the protection scope of this application.

A vehicle frame is a frame structure, commonly known as a rail, that spans the front and rear axles of a vehicle and is a base of the vehicle. The vehicle frame is generally formed by two longitudinal rails and several crossmembers, and is supported by the wheels via a suspension apparatus, a front axle, and a rear axle. The vehicle frame needs to have sufficient strength and stiffness to withstand the load of the vehicle and the impact from the wheels. The function of the vehicle frame is to support and connect various assemblies of the vehicle to make each assembly maintain a relatively correct position, and to withstand various loads inside and outside the vehicle.

In order to guarantee the overall torsional mode and stiffness of the vehicle, an existing vehicle frame needs to have both longitudinal rails and crossmembers, that is, the vehicle frame needs to have both longitudinal rails in a direction between front and rear wheels and crossmembers in a direction between the front wheels and in a direction between the rear wheels, and a main structure of a steering gear is generally mounted on the crossmember in the direction between the front wheels. Some vehicles are provided with a vehicle subframe for mounting and fixing a main body of a steering gear in order to optimize a mounting structure of the steering gear.

The inventors of this application have noted that both the crossmember and the vehicle subframe lead to increased overall mass of the vehicle, and the increase of the overall mass of the vehicle also means an increase in fuel consumption, which leads to decline in product competitiveness under a current environment with shortage in oil resources, rising of oil prices and global promotion of energy conservation and emission reduction.

In order to enhance the product competitiveness, the inventors of this application have found in research that combination of a steering gear structure with longitudinal rails of a vehicle can guarantee the torsional mode and stiffness of the vehicle while achieving light-weighting of the body.

Specifically, the inventors of this application have found through inspection and testing that the steering gear itself has good strength and stiffness, so that the steering gear can replace the crossmember to be fixed between the longitudinal rails, and through a reasonable structural arrangement, the two ends of the steering gear rod are movably connected to the wheels, so that the steering gear serves as the supporting crossmember of the vehicle frame to guarantee the torsional mode and stiffness of the vehicle on one hand, and is used to drive the wheels to steer on the other hand. In this way, the steering gear replaces the crossmember to be fixed between the longitudinal rails, integrating and simplifying the crossmember plus steering gear structure on the existing body into a separate steering gear structure, thus reducing the body mass and achieving light-weighting.

Referring to FIG. 1, FIG. 1 is a schematic structural diagram of a vehicle 1000 according to some embodiments of this application. The vehicle 1000 may be a fossil fuel vehicle, a natural-gas vehicle, or a new energy vehicle, where the new energy vehicle may be a battery electric vehicle, a hybrid electric vehicle, a range-extended vehicle, or the like. The vehicle 1000 is provided with a battery 100 inside, where the battery 100 may be disposed at the bottom, front, or rear of the vehicle 1000. The battery 100 may be configured to supply power to the vehicle 1000. For example, the battery 100 may be used as an operational power source for the vehicle 1000. The vehicle 1000 may further include a controller 200 and a motor 300, where the controller 200 is configured to control the battery 100 to supply power to the motor 300, for example, to satisfy power needs of start, navigation, and driving of the vehicle 1000.

According to an aspect of the embodiments of this application, a vehicle frame 10 is provided. Specifically, referring to FIG. 2, the figure shows a structure of the vehicle frame 10 according to an embodiment of this application. The vehicle frame includes longitudinal rails 11 and a steering gear 12, where the steering gear 12 includes a shell 121 and a steering rod 122 slidably disposed in the shell 121; two ends of the shell 121 are fixedly connected to the longitudinal rails 11; and two ends of the steering rod 122 respectively protrude out of the longitudinal rails 11, so as to be movably connected to wheels, and the steering rod 122 drives the wheels to steer when the steering rod slides.

The shell 121 of the steering gear 12 sleeves around outside of the steering rod 122, and the two ends of the shell 121 may run through the longitudinal rails 11 or may be fixedly connected to the longitudinal rails 11 via a connection structure. The shell 121 is fixed between the longitudinal rails 11 to carry the pressure and torsional moment between the longitudinal rails 11.

The longitudinal rails 11 are arranged in a direction between front and rear of the vehicle, and are one of the key parts in the vehicle frame, which play an important role in carrying the load in the vehicle. Side rail type vehicle frames, center rail type vehicle frames, and the like of vehicles all contain longitudinal rails. The longitudinal rail is generally made of low-alloy steel plate through stamping, a section shape of which is generally a groove type, and some longitudinal rails are made with Z-shaped or box-shaped sections.

The steering gear 12 is a machine that helps the driver to exert force when the driver turns the steering wheel, so as to reduce the driver's steering force and realize easy and convenient driving for the driver. Steering gears are mainly divided into rack and pinion type steering and worm gear and rod type steering. Power steering apparatuses are generally divided into three types according to driving method: electric motor power steering, rack and pinion hydraulic power steering, and electric hydraulic power steering.

The two ends of the steering rod 122 are used to be connected to the steering knuckles on the wheel hubs, and the two ends of the steering rod 122 pull the wheel hubs for steering assistance when the steering rod 122 slides relative to the shell 121 under electric motor power drive, rack and pinion hydraulic drive or electric hydraulic drive.

Compared with an existing vehicle frame, the vehicle frame 10 provided in this embodiment of this application removes a crossmember disposed between the longitudinal rails. The two ends of the shell 121 are fixedly connected to the longitudinal rails 11 to achieve the bearing capacity of the shell 121 for the longitudinal rails 11, thereby guaranteeing the torsional mode and stiffness of the vehicle. The longitudinal rail 11 is disposed on the inner side of the wheel, and the two ends of the steering rod 122 respectively protrude out of the longitudinal rails 11 to be movably connected to the outer wheels, so that the steering rod 122 drives the wheels at both ends to steer when the steering rod 122 slides in the shell 121. In this way, not only assembly and fixation of the steering gear 12 and control of the wheel steering are implemented, but also the torsional mode and stiffness of the vehicle are guaranteed.

Figure 2:
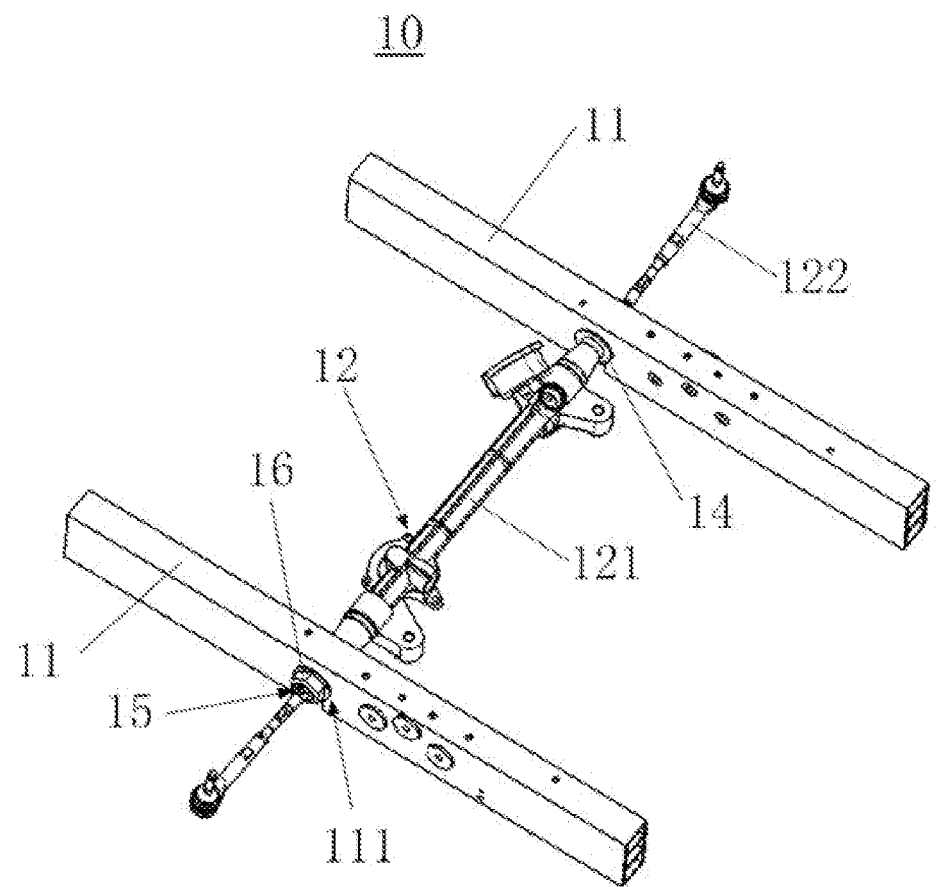
FIG. 2 is a schematic structural diagram of a vehicle frame according to an embodiment of this application.

Still referring to FIG. 2, according to some embodiments of this application, the longitudinal rails 11 are each provided with a through hole 111, the two ends of the shell 121 are fixed in the through holes 111, and the steering rod 122 runs through the through holes 111, with two ends of the steering rod 122 protruding from the through holes 111.

The longitudinal rails 11 being each provided with the through hole 111 and the two ends of the shell 121 being fastened in the through holes 111 can not only implement assembly and fixation of the shell 121 and the longitudinal rails 11, but also ensure good bearing effect of the shell 121 between the longitudinal rails 11, thus guaranteeing the strength and stiffness of the overall structure of the vehicle frame 10 and making the vehicle have a good torsional mode in subsequent assembly.

According to some other embodiments of this application, in order to reduce impact of provision of the through hole 111 in the longitudinal rail 11 on the overall structural strength of the longitudinal rail 11, the two ends of the shell 121 may also be fixed to the longitudinal rails 11 by means of threaded connection of a thread connecting member or welding. A specific connection structure and connection method are not limited, provided that the steering rod 122 can protrude out of the longitudinal rails 11 and the vehicle frame 10 can meet requirements such as vehicle structure strength.

Figure 3:
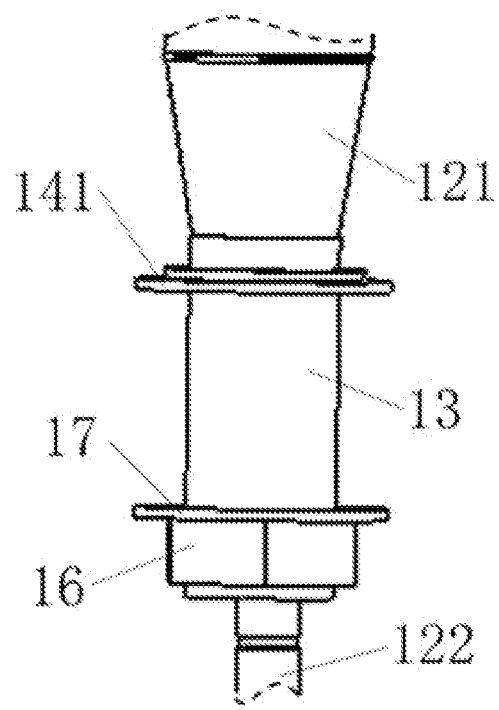
FIG. 3 is a schematic structural diagram of an end of the steering gear in a vehicle frame according to an embodiment of this application.

Still referring to FIG. 2, and further referring to FIG. 3, FIG. 3 shows a connection structure of the two ends of the shell 121 and the through holes 111 in the vehicle frame 10 according to an embodiment of this application. According to some embodiments of this application, the through hole 111 is provided with a support sleeve 13, and the two ends of the shell 121 are fastened in the support sleeves 13.

Considering that provision of the through hole 111 in the longitudinal rail 11 leads to reduction of the strength of the overall structure of the longitudinal rail 11, the longitudinal rail structure is relatively weak and less stable at the through hole 111. Therefore, the support sleeve 13 is provided in the through hole 111 to implement support of the support sleeve 13 to the inner side wall of the through hole 111, thereby enhancing the structural strength of the longitudinal rail 11 in the through hole 111, and ensuring good and stable bearing capacity of the vehicle frame 10.

During design and assembly, an outer diameter of the support sleeve 13 may be slightly larger than an inner diameter of the through hole 111, and the support sleeve 13 is provided in the through hole 111 by riveting, so as to ensure solid connection between the support sleeve 13 and the through hole 111 on one hand, and make the support sleeve 13 play an adequate and effective supporting role for the through hole 111 on the other hand. The support sleeve 13 is preferably made of steel, which has high structural strength and can ensure good support capacity of the support sleeve 13.

According to some embodiments of this application, the support sleeve 13 is welded to the longitudinal rail 11.

Considering that the fixed connection between the support sleeve 13 and the through hole 111 has no restraint structure in the axial direction of the support sleeve 13, and the restraint ability is relatively poor even through riveted connection, in order to avoid loosening of the connection between the support sleeve 13 and the through hole 111, which causes slipping of the support sleeve 13, damage to the structure of the steering gear 12, and the like, the support sleeve 13 is welded to the longitudinal rail 11 to ensure sufficient restraint for the support sleeve 13 in the axial direction, thus improving the stability of the assembly connection between the steering gear 12 and the longitudinal rail 11 and guaranteeing the overall strength and bearing capacity of the vehicle frame 10.

The support sleeve 13 may be welded to the longitudinal rail 11 by means of welding seam connection. Specifically, outer edges along the open ends of the through holes 111 in the longitudinal rails 11 are circumferentially welded to the support sleeves 13 to ensure sufficient and effective welding fixation between the support sleeve 13 and the longitudinal rail 11, and such means of welding is easy to operate and conducive to improving welding assembly efficiency.

Still referring to FIG. 2, according to some embodiments of this application, the two ends of the shell 121 are each provided with a restraint portion 14, and the restraint portion 14 abuts against an inner side wall of the longitudinal rail 11.

In order to guarantee the restraint and fixation of the steering gear 12 in the axial direction, the two ends of the shell 121 are each provided with the restraint portion 14, and the restraint portion abuts against the inner side wall of the longitudinal rail, so as to implement restraint and fixation of the shell 121 of the steering gear 12 and the longitudinal rail 11 in the axial direction during assembly and connection.

Still referring to FIG. 2, and further referring to FIG. 3, according to some embodiments of this application, the restraint portion 14 includes a flange 141 or a protrusion disposed in the shell 121.

A flange is also known as a flange disk or a protrusion. Flanges are shaft-to-shaft interconnecting parts for connections between pipe ends; and there are also flanges used on inlet and outlet of devices for connections between two devices, such as reducer flanges. Flange connection or flange joint refers to detachable connection of flange, washer and bolt interconnected as a group of combined sealing structure. Pipe flanges refer to flanges for pipe fittings in piping apparatus, and pipe flanges used in devices refer to the import and export flanges of such devices. The flanges are provided with holes, and bolts make two flanges tightly connected. Washers are used to seal the flanges. The flanges are divided into threaded connection (fillet connection) flanges, welding flanges, and clamp flanges. The flanges are used in pairs, wire connection flanges may be used in low-pressure pipelines, and welding flanges are used for over four kilograms of pressure. A gasket is added between two flanges and then fastened with bolts. Flanges for different pressures have different thicknesses and use different bolts. When pumps and valves are connected with pipes, part of these devices is also made into corresponding flange shapes, also known as flange connection. Connection parts using bolts around two planes for both connecting and sealing are generally known as "flanges", such as connection of ventilation ducts. This type of parts may be called "flange parts". However, this type of connection is only part of a device, such as connection between a flange and a pump, where the pump is not appropriate to be called a "flange part". Smaller parts, such as valves, may be called "flange parts".

The flange 141 in the embodiments of this application may fit around and be fixed to the two ends of the shell 121 of the steering gear 12 by riveting or welding, and the flange 141 abuts against the inner side wall of the longitudinal rail 11 to implement axial fixation of the steering gear 12.

Specifically, the flange 141 may be circumferentially provided with connection holes, and the flange 141 is further connected to the longitudinal rail 11 by screws running through the connection holes; and certainly, the outer edge of the flange 141 may alternatively be welded to the longitudinal rail 11 along the circumference, which can also enhance the stability of connection between the flange 141 and the longitudinal rail 11, thus fully guaranteeing the limiting ability of the shell 121.

It can be understood that, in some other embodiments, the restraint portion 14 may alternatively be formed by the surface of the two ends of the shell 121 protruding outward to form a ring or a protrusion of another shape, and the axial restraint of the shell 121 may be implemented by the protrusion abutting against the inner side wall of the longitudinal rail 11. The protrusion and the shell 121 are an integrally formed structure, which is more stable, featuring better restraint of connection between the shell 121 and the longitudinal rail 11. Likewise, the protrusion may further be fixed with the longitudinal rail 11 by means of the thread connecting member or by welding, so as to fully guarantee the stability of assembly connection between the shell 121 and the longitudinal rail 11 and improve the overall strength and bearing capacity of the vehicle frame 10.

Still referring to FIG. 2, according to some embodiments of this application, the two ends of the shell 121 protrude out of the longitudinal rails 11, and the shell 121 is provided with an external thread 15 at a position protruding out of the longitudinal rail 11; and the external thread 15 is connected to a thread connecting member 16, where the thread connecting member 16 abuts against an outer side wall of the longitudinal rail 11.

Threaded connection is a kind of widely used removable fixed connection and has advantages such as simple structure, reliable connection, and easy assembly and disassembly. The traditional method of thread inspection is using a thread gauge for contact or a universal tool-measuring microscope for manual measurement, featuring large workload and low work efficiency, and measurement results susceptible to human influences. During contact measurement, a thread gauge is prone to wear, which affects measurement accuracy, and the cost of replacing the gauge is also high. In addition, in some workplaces, it is difficult to complete the inspection manually. In view of this, automatic thread inspection devices are required to solve the bottleneck problem of thread inspection, so as to improve the benefits of fastener enterprises. According to a shape of a plane figure, thread may be divided into triangular thread, rectangular thread, trapezoidal thread, serrated thread, and the like. According to a winding direction of spiral thread, thread may be divided into left-hand thread and right-hand thread. It is stipulated that when the thread is upright, the spiral thread rising to the right is right-hand thread and the spiral thread rising to the left is left-hand thread. The right-hand thread is generally used in mechanical manufacturing, and the left-hand thread is used only for special requirements. By the number of spiral thread, the threads may be divided into single threads and multiples thread arranged equidistantly. For the convenience of manufacturing, the thread generally has not more than 4 threads.

In order to ensure adequate and stable assembly connection between the shell 121 and the longitudinal rail 11, the two ends of the shell 121 are arranged protruding out of the longitudinal rails 11, and the shell 121 is provided with the external thread 15 at the position protruding out of the longitudinal rail 11, which is connected to the external thread 15 via the thread connecting member 16 on one hand and abuts against the outer side wall of the longitudinal rail 11 on the other hand. The thread connecting member 16 may be, for example, a nut, so as to implement assembly connection between the part of the shell 121 protruding out of the longitudinal rail 11 and the longitudinal rail 11, guaranteeing the structural stability of the steering gear 12 in the vehicle frame 10, and thus improving the overall strength and stability of the vehicle frame 10.

Still referring to FIG. 2, and further referring to FIG. 3, according to some embodiments of this application, the shell 121 is sleeved with a washer 17 between the thread connecting member 16 and the outer side wall of the longitudinal rail 11, where two sides of the washer 17 respectively abut against the outer side wall of the longitudinal rail 11 and the thread connecting member 16.

A washer refers to a part that is padded between a connected member and a nut. The washer is generally a flat metal ring used to protect the surface of the connected member from nut abrasion and disperse pressure of the nut on the connected member.

Washers are divided into flat washers-class C, large washers-class A and C, extra large washers-class C, small washers-class A, flat washers-class A, flat washers-chamfered type-class A, high strength washers for steel structures, spherical washers, tapered washers, square bevel washers for H-beam, square bevel washers for channel steel, standard spring washers, light spring washers, heavy spring washers, inner tooth lock washers, inner serrated lock washers, outer tooth lock washers, external serrated lock washers, single-ear stop washers, double-ear stop washers, external tab washers, stop washers for round nuts.

A flat washer is generally used for connecting members with one being soft in texture and one being hard in texture and brittle, and a main function of the flat washer is to increase a contact area and disperse pressure to prevent the one being soft in texture from being crushed. A basic function of a spring washer is to apply a force to a nut after the nut is tightened, increasing friction between the nut and a bolt. The spring washers are widely used in load-bearing and non-load-bearing structures of general mechanical products, with characteristics such as low costs, convenient installation, suitability for parts featuring frequent assembly and disassembly. However, the spring washers have low anti-loosening capacity and have low adoption rate especially in products requiring high reliability.

The washer 17 being provided between the thread connecting member 16 and the outer side wall of the longitudinal rail 11 on one hand can avoid frictional damage to the surface of the longitudinal rail 11 during tightening of the thread connecting member 16, and on the other hand, the washer 17 can share the pressure of the thread connecting member 16 on the outer side wall of the longitudinal rail 11, so that the thread connecting member 16 can be tightened to a greater extent without causing damage to the longitudinal rail 11, thus making the connection structure between the shell 121 and the longitudinal rail 11 more stable and reliable.

According to some embodiments of this application, the washer 17 is welded to both the longitudinal rail 11 and the shell 121.

The washer 17 being welded to both the longitudinal rail 11 and the shell 121 can further ensure stable relative positions of the washer 17, the longitudinal rail 11, and the shell 121, making the connection structure between the shell 121 and the longitudinal rail 11 stable and reliable, and thereby guaranteeing the overall structural strength of the vehicle frame 10 and the torsional mode of the vehicle.

Specifically, the washer 17 may be welded to the longitudinal rail 11 by means of welding seam connection along the outer edge circumferentially and welded to the surface of the shell 121 by means of welding seam connection along the inner edge circumferentially, so as to fully guarantee the stability of the washer 17.

According to another aspect of the embodiments of this application, a vehicle 1 is provided. Specifically, referring to FIG. 4, the figure shows a structure of the vehicle 1 according to an embodiment of this application. The vehicle 1 includes the vehicle frame 10 described in any one of the foregoing embodiments.

In the vehicle 1 provided in this embodiment of this application, the vehicle frame 10 removes a crossmember disposed between longitudinal rails compared with an existing vehicle frame, and achieves the bearing capacity of the shell 121 on the longitudinal rails 11 by connecting two ends of the shell 121 to the longitudinal rails 11 in a fixed manner, thereby guaranteeing the torsional mode and stiffness of the vehicle 1 as a whole. The longitudinal rail 11 is disposed on the inner side of the wheel, and the two ends of the steering rod 122 respectively protrude out of the longitudinal rails 11 to be movably connected to the outer wheels, so that the steering rod 122 drives the wheels at both ends to steer when the steering rod 122 slides in the shell 121. In this way, not only assembly and fixation of the steering gear 12 and control of the wheel steering are implemented, but also the torsional mode and stiffness of the vehicle are guaranteed.

Figure 4:
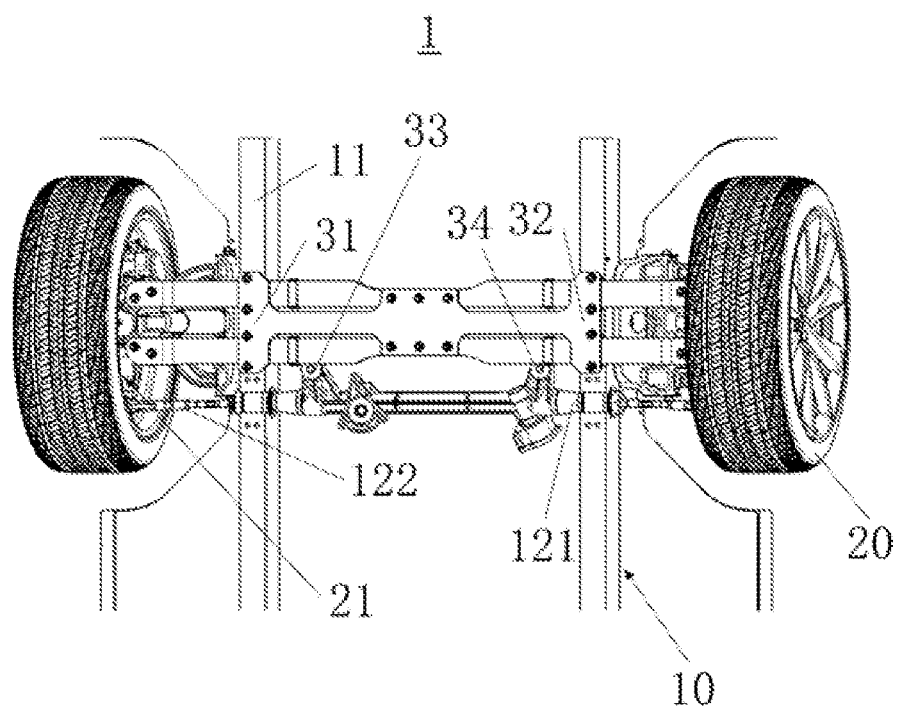
FIG. 4 is a schematic structural diagram of a vehicle according to an embodiment of this application.

Still referring to FIG. 4, according to some embodiments of this application, the vehicle 1 further includes front wheels 20 disposed on the outsides of the longitudinal rails 11, where the front wheel 20 has a steering knuckle 21; and the two ends of the steering rod 122 are rotatably connected to the steering knuckles 21, and the steering knuckle 21 drives the front wheel 20 to steer when the steering rod 122 slides.

A steering knuckle, also called a "ram's horn", is one of the important parts in a steering axle of a vehicle, which can make the vehicle drive stably and transfer a driving direction sensitively. A function of the steering knuckle is to transfer and bear the front load of the vehicle, support and drive the front wheels to turn around the main pin and make the vehicle steer. In the driving state of the vehicle, the steering knuckle is subjected to variable impact loads, and therefore is required to have high strength.

The steering knuckle is a hinge for wheel steering and is generally fork-shaped. The upper and lower forks have two coaxial holes for mounting the main pin, and the steering knuckle journal is configured to mount the wheel. Two ears of the pin holes on the steering knuckle are connected to fist-shaped parts on two ends of the front axle through the main pin, so that the front wheels can deflect around the main pin at a specified angle to make the vehicle steer. In order to reduce wear, bronze bushings are pressed into the pin holes of the steering knuckle, and the bushings are lubricated by grease injected from an oil nozzle installed on the steering knuckle. In order to make steering flexible, a bearing is installed between the lower lug of the steering knuckle and the fist-shaped part of the front axle. An adjustment shim is further installed between the upper lug of the steering knuckle and the fist-shaped part to adjust a gap therebetween.

The two ends of the steering rod 122 protruding out of the longitudinal rails being rotatably connected to the steering knuckles 21 can implement control of the steering of the front wheels by the steering rod 122, thus satisfying working position conditions during assembly of the steering gear 12 while reducing the overall mass of the vehicle 1.

Still referring to FIG. 4, according to some embodiments of this application, the vehicle 1 further includes a leaf spring, where the leaf spring is fixedly connected to the shell 121 and the longitudinal rail 11, and two ends of the leaf spring are fixedly connected to the front wheels 20.

A leaf spring is a leaf-shaped spring made of no less than 1 piece of spring steel superimposed and combined. Leaf springs are usually used in wheeled vehicle suspensions and are originally called laminated springs or bracket springs, sometimes referred to as semi-elliptical springs or cart springs. Leaf springs are one of the oldest forms of springs.

The leaf spring is an elongated arc-shaped spring steel with a rectangular cross section. In a most common configuration, the center of the arc provides a position for axle, and a loop formed at either end is attached to a vehicle chassis. For a quite heavy vehicle, the leaf spring may be made from multiple leaves laminated together and typically has leaves with gradually decreasing length. The leaf spring may be used for positioning and some degree of damping as well as a spring function. The leaf spring may be directly connected to frames at both ends, or directly connected at one end, usually the front end, with the other end connected via a looped link in short swing arm connection. With tightness comes a tendency for the leaf to elongate when compressed, resulting in a softer elasticity. Some springs terminate at a recessed end that is called a scoop end, and are used to carry rotating members.

When the leaf spring is installed in the vehicle suspension and bearing a positive vertical load, all spring leaf is stressed and deformed and has a tendency to arch upward. In this case, the axle and the vehicle frame are approaching each other. When the axle and the vehicle frame are leaving each other, the positive vertical load and deformation of the leaf spring gradually decrease.

For the leaf spring used in this application, specifically, the two ends of the leaf spring are fixedly connected to the two front wheels 20, a first portion 31 and a second portion 32 in the middle are fixedly connected to the two longitudinal rails 11, and a third portion 33 and a fourth portion 34 are both fixedly connected to the shell 121, where a specific manner for fixed connection may be connection using a thread connecting member or fixation of thread connection combined with welding. The leaf spring being provided as a suspension for the front wheels 20 in the vehicle 1 can ensure that the leaf spring plays a good role in carrying and cushioning the front wheels 20 when the vehicle 1 is driving on a bumpy road.

It should be noted that, unless otherwise stated, technical terms or scientific terms used in the embodiments of this application should have general meanings as understood by persons skilled in the art to which the embodiments of this application belongs.

In the description of the embodiments of this application, the orientations or positional relationships indicated by the technical terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the apparatuses or components mentioned must have specific orientations or must be constructed or manipulated according to specific orientations, and therefore shall not be construed as any limitations on embodiments of this application.

In addition, the technical terms "first", "second", and the like are merely for the purpose of description, and shall not be understood as any indication or implication of relative importance or any implicit indication of the number of technical features indicated. In the descriptions of this application, "a plurality of" means at least two unless otherwise specifically stated.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, any may refer to a direct connection, an indirect connection via an intermediate medium, or an interaction between two elements. Persons of ordinary skill in the art can understand specific meanings of these terms in this application as appropriate to specific situations.

In the description of the embodiments of this application, unless otherwise specified and defined explicitly, a first feature being "above" or "below" a second feature may refer to direct contact between the first feature and the second feature, or indirect contact between the first feature and the second feature via an intermediate medium. Moreover, the first feature being "above", "over", and "on" the second feature may refer to that the first feature is directly above or diagonally above the second feature, or merely represent that the first feature is horizontally higher than the second feature. The first feature being "below", "under", and "down" the second feature may refer to that the first feature is directly below or diagonally below the second feature, or merely represent that the first feature is horizontally lower than the second feature.

In conclusion, it should be noted that the above examples are merely intended for describing the technical solutions of this application but not for limiting this application. Although this application is described in detail with reference to the foregoing examples, persons of ordinary skill in the art should understand that they may still make modifications to the technical solutions described in the foregoing examples or make equivalent replacements to some or all technical features thereof without departing from the scope of the technical solutions of the examples of this application. They should all be covered in the scope of claims and summary in this application. In particular, as long as there is no structural conflict, the various technical features mentioned in the embodiments can be combined in any manners. This application is not limited to the specific embodiments disclosed in this specification, but includes all technical solutions falling within the scope of the claims.

The invention claimed is:

1. A vehicle frame comprising longitudinal rails and a steering gear; wherein
the steering gear comprises a shell and a steering rod slidably disposed in the shell;
two ends of the shell are fixedly connected to the longitudinal rails, respectively; and
two ends of the steering rod respectively protrude out of the longitudinal rails, so as to be movably connected to wheels, and the steering rod drives the wheels to steer when the steering rod slides, wherein
the longitudinal rails are each provided with a through hole, wherein the two ends of the shell are fastened in the through holes; and
the steering rod runs through the through holes, with two ends of the steering rod protruding out of the through holes, wherein the two ends of the shell protrude out of the longitudinal rails, and the shell is provided with an external thread at a position protruding out of the longitudinal rail; and
the external thread is connected to a thread connecting member, wherein the thread connecting member abuts against an outer side wall of the longitudinal rail.

2. The vehicle frame according to claim 1, wherein each of the through hole is provided with a support sleeve, and the two ends of the shell are fastened in the support sleeves.

3. The vehicle frame according to claim 2, wherein the support sleeve is welded to the longitudinal rail.

4. The vehicle frame according to claim 1, wherein the two ends of the shell are each provided with a restraint portion, and the restraint portion abuts against an inner side wall of the longitudinal rail.

5. The vehicle frame according to claim 4, wherein the restraint portion comprises a flange or a protrusion disposed in the shell.

6. The vehicle frame according to claim 1, wherein the shell is sleeved with a washer between the thread connecting member and the outer side wall of the longitudinal rail, wherein two sides of the washer respectively abut against the outer side wall of the longitudinal rail and the thread connecting member.

7. The vehicle frame according to claim 6, wherein the washer is welded to both the shell and the longitudinal rail.

8. A vehicle, characterized by comprising the vehicle frame according to claim 1.

9. The vehicle according to claim 8, wherein
the vehicle further comprises front wheels disposed on the outer sides of the longitudinal rails, wherein the front wheels have a steering knuckle; and
two ends of the steering rod are rotatably connected to the steering knuckles, and the steering knuckle drives the front wheel to steer when the steering rod slides.

10. The vehicle according to claim 9, wherein the vehicle further comprises a leaf spring, wherein the leaf spring is fixedly connected to the shell and the longitudinal rail, and two ends of the leaf spring are fixedly connected to the front wheels.

* * * * *